(12) United States Patent
Nishioka et al.

(10) Patent No.: US 7,474,514 B2
(45) Date of Patent: Jan. 6, 2009

(54) MAGNETORESISTIVE HEAD AND MANUFACTURING METHOD THEREOF

(75) Inventors: Kouichi Nishioka, Kanagawa (JP); Satoshi Shigematsu, Kanagawa (JP); Yasunari Tajima, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 314 days.

(21) Appl. No.: 11/171,910

(22) Filed: Jun. 29, 2005

(65) Prior Publication Data

US 2006/0002040 A1    Jan. 5, 2006

(30) Foreign Application Priority Data

Jun. 30, 2004    (JP) ............................. 2004-192463

(51) Int. Cl.
*G11B 5/39* (2006.01)
(52) U.S. Cl. ............................................... 360/324.12
(58) Field of Classification Search ............ 360/324.12, 360/324.1, 324.11, 319, 314; 29/603.14
See application file for complete search history.

(56) References Cited

U.S. PATENT DOCUMENTS

| | | | | |
|---|---|---|---|---|
| 2002/0159205 A1* | 10/2002 | Kula et al. | ............. | 360/324.11 |
| 2003/0002228 A1* | 1/2003 | Suwabe et al. | ............. | 360/324.1 |
| 2003/0021071 A1* | 1/2003 | Kula et al. | ............. | 360/324.1 |
| 2003/0227721 A1* | 12/2003 | Gill | ............. | 360/314 |
| 2004/0228044 A1* | 11/2004 | Hasegawa et al. | ......... | 360/324.1 |
| 2007/0137028 A1* | 6/2007 | Carey et al. | ............. | 29/603.14 |
| 2007/0139826 A1* | 6/2007 | Carey et al. | ............. | 360/319 |

FOREIGN PATENT DOCUMENTS

| | | | |
|---|---|---|---|
| JP | 2001-189503 A | 7/2001 |
| JP | 2002-289947 A | 10/2002 |

* cited by examiner

*Primary Examiner*—Tianjie Chen
(74) *Attorney, Agent, or Firm*—Townsend and Townsend and Crew LLP; Rambod Nader (57) ABSTRACT

Exchange coupling energy between an anti-ferromagnetic layer and a first ferromagnetic layer, and an anti-ferromagnetic coupling energy between the first ferromagnetic layer and a second ferromagnetic layer by way of an Ru anti-ferromagnetic coupling layer of a spin valve device are increased thereby increasing the magnetoresistance ratio and decreasing the coercivity of the free layer of the spin valve film. In an MnPt anti-ferromagnetic bottom type synthetic ferri-type spin valve film in which an underlayer, an anti-ferromagnetic layer comprising MnPt, a first ferromagnetic layer comprising CoFe, an anti-ferromagnetic coupling layer comprising Ru, a second ferromagnetic layer comprising CoFe, an intermediate non-magnetic layer comprising Cu, a free layer comprising synthetic films of CoFe and NiFe and a protective layer are stacked over a substrate, the Fe composition X in CoFeX of the first ferromagnetic layer is set as about: $20 < x \leqq 50$ at %.

10 Claims, 10 Drawing Sheets

| No. | tCF (Å) | tNF (Å) | X(at%) | Z(wt%) | Protective Layer |
|---|---|---|---|---|---|
| 1 | 10.0 | 15.0 | 20.8 | 15.5 | Cu 6Å/Ta 20Å |
| 2 | 10.0 | 15.0 | 24.9 | 15.8 | Cu 6Å/Ta 20Å |
| 3 | 10.0 | 15.0 | 24.9 | 16.7 | Cu 6Å/Ta 20Å |
| 4 | 10.0 | 15.0 | 24.9 | 17.6 | Cu 6Å/Ta 20Å |
| 5 | 10.0 | 15.0 | 23.0 | 14.0 | Cu 6Å/Ta 20Å |
| 6 | 10.0 | 15.0 | 23.0 | 14.8 | Cu 6Å/Ta 20Å |
| 7 | 10.0 | 15.0 | 23.0 | 15.8 | Cu 6Å/Ta 20Å |
| 8 | 10.0 | 15.0 | 17.6 | 11.1 | Cu 6Å/Ta 20Å |
| 9 | 10.0 | 15.0 | 17.6 | 12.2 | Cu 6Å/Ta 20Å |
| 10 | 10.0 | 15.0 | 17.6 | 13.2 | Cu 6Å/Ta 20Å |
| 11 | 10.0 | 15.0 | 15.1 | 10.2 | Cu 6Å/Ta 20Å |
| 12 | 10.0 | 15.0 | 15.1 | 11.1 | Cu 6Å/Ta 20Å |
| 13 | 10.0 | 15.0 | 15.1 | 12.2 | Cu 6Å/Ta 20Å |
| 14 | 10.0 | 15.0 | 12.4 | 8.9 | Cu 6Å/Ta 20Å |
| 15 | 10.0 | 15.0 | 12.4 | 9.8 | Cu 6Å/Ta 20Å |
| 16 | 10.0 | 15.0 | 12.4 | 10.5 | Cu 6Å/Ta 20Å |
| 17 | 10.0 | 15.0 | 10.0 | 8.0 | Cu 6Å/Ta 20Å |
| 18 | 10.0 | 15.0 | 10.0 | 8.9 | Cu 6Å/Ta 20Å |
| 19 | 10.0 | 15.0 | 10.0 | 9.8 | Cu 6Å/Ta 20Å |
| 20 | 10.0 | 15.0 | 20.8 | 15.5 | Ru 6Å/Ta 20Å |
| 21 | 10.0 | 15.0 | 24.9 | 15.8 | Ru 6Å/Ta 20Å |
| 22 | 10.0 | 15.0 | 24.9 | 16.7 | Ru 6Å/Ta 20Å |
| 23 | 10.0 | 15.0 | 24.9 | 17.6 | Ru 6Å/Ta 20Å |
| 24 | 10.0 | 15.0 | 23.0 | 14.0 | Ru 6Å/Ta 20Å |
| 25 | 10.0 | 15.0 | 23.0 | 14.8 | Ru 6Å/Ta 20Å |
| 26 | 10.0 | 15.0 | 23.0 | 15.8 | Ru 6Å/Ta 20Å |
| 27 | 10.0 | 15.0 | 17.6 | 11.1 | Ru 6Å/Ta 20Å |
| 28 | 10.0 | 15.0 | 17.6 | 12.2 | Ru 6Å/Ta 20Å |
| 29 | 10.0 | 15.0 | 17.6 | 13.2 | Ru 6Å/Ta 20Å |
| 30 | 10.0 | 15.0 | 15.1 | 10.2 | Ru 6Å/Ta 20Å |
| 31 | 10.0 | 15.0 | 15.1 | 11.1 | Ru 6Å/Ta 20Å |
| 32 | 10.0 | 15.0 | 15.1 | 12.2 | Ru 6Å/Ta 20Å |
| 33 | 10.0 | 15.0 | 12.4 | 8.9 | Ru 6Å/Ta 20Å |
| 34 | 10.0 | 15.0 | 12.4 | 9.8 | Ru 6Å/Ta 20Å |
| 35 | 10.0 | 15.0 | 12.4 | 10.5 | Ru 6Å/Ta 20Å |
| 36 | 10.0 | 15.0 | 10.0 | 8.0 | Ru 6Å/Ta 20Å |
| 37 | 10.0 | 15.0 | 10.0 | 8.9 | Ru 6Å/Ta 20Å |
| 38 | 10.0 | 15.0 | 10.0 | 9.8 | Ru 6Å/Ta 20Å |

Fig. 15

| No. | tCF (Å) | tNF (Å) | X(at%) | Z(wt%) | Protective Layer |
|---|---|---|---|---|---|
| 39 | 17.5 | 0.0 | 15.8 | 15.5 | Ru 6Å/Ta 20Å |
| 40 | 15.0 | 5.0 | 15.8 | 15.5 | Ru 6Å/Ta 20Å |
| 41 | 12.5 | 10.0 | 18.7 | 15.5 | Ru 6Å/Ta 20Å |
| 42 | 10.0 | 15.0 | 22.3 | 15.5 | Ru 6Å/Ta 20Å |
| 43 | 7.5 | 20.0 | 28.9 | 15.5 | Ru 6Å/Ta 20Å |
| 44 | 5.0 | 25.0 | 28.9 | 15.5 | Ru 6Å/Ta 20Å |
| 45 | 20.0 | 0.0 | 15.3 | 15.5 | Ru 6Å/Ta 20Å |
| 46 | 17.5 | 5.0 | 14.8 | 15.5 | Ru 6Å/Ta 20Å |
| 47 | 15.0 | 10.0 | 16.3 | 15.5 | Ru 6Å/Ta 20Å |
| 48 | 12.5 | 15.0 | 17.3 | 15.5 | Ru 6Å/Ta 20Å |
| 49 | 10.0 | 20.0 | 17.3 | 15.5 | Ru 6Å/Ta 20Å |
| 50 | 7.5 | 25.0 | 20.3 | 15.5 | Ru 6Å/Ta 20Å |
| 51 | 5.0 | 30.0 | 20.3 | 15.5 | Ru 6Å/Ta 20Å |
| 52 | 22.5 | 0.0 | 14.8 | 15.5 | Ru 6Å/Ta 20Å |
| 53 | 20.0 | 5.0 | 14.5 | 15.5 | Ru 6Å/Ta 20Å |
| 54 | 17.5 | 10.0 | 15.3 | 15.5 | Ru 6Å/Ta 20Å |
| 55 | 15.0 | 15.0 | 15.3 | 15.5 | Ru 6Å/Ta 20Å |
| 56 | 12.5 | 20.0 | 15.3 | 15.5 | Ru 6Å/Ta 20Å |
| 57 | 10.0 | 25.0 | 12.8 | 15.5 | Ru 6Å/Ta 20Å |
| 58 | 7.5 | 30.0 | 9.8 | 15.5 | Ru 6Å/Ta 20Å |
| 59 | 5.0 | 35.0 | 20.3 | 15.5 | Ru 6Å/Ta 20Å |
| 60 | 17.5 | 0.0 | 20.8 | 15.5 | Ru 6Å/Ta 20Å |
| 61 | 15.0 | 5.0 | 20.8 | 15.5 | Ru 6Å/Ta 20Å |
| 62 | 12.5 | 10.0 | 20.8 | 15.5 | Ru 6Å/Ta 20Å |
| 63 | 10.0 | 15.0 | 20.8 | 15.5 | Ru 6Å/Ta 20Å |
| 64 | 7.5 | 20.0 | 20.8 | 15.5 | Ru 6Å/Ta 20Å |
| 65 | 5.0 | 25.0 | 20.8 | 15.5 | Ru 6Å/Ta 20Å |
| 66 | 20.0 | 0.0 | 20.8 | 15.5 | Ru 6Å/Ta 20Å |
| 67 | 17.5 | 5.0 | 20.8 | 15.5 | Ru 6Å/Ta 20Å |
| 68 | 15.0 | 10.0 | 20.8 | 15.5 | Ru 6Å/Ta 20Å |
| 69 | 12.5 | 15.0 | 20.8 | 15.5 | Ru 6Å/Ta 20Å |
| 70 | 10.0 | 20.0 | 20.8 | 15.5 | Ru 6Å/Ta 20Å |
| 71 | 7.5 | 25.0 | 20.8 | 15.5 | Ru 6Å/Ta 20Å |
| 72 | 5.0 | 30.0 | 20.8 | 15.5 | Ru 6Å/Ta 20Å |
| 73 | 22.5 | 0.0 | 20.8 | 15.5 | Ru 6Å/Ta 20Å |
| 74 | 20.0 | 5.0 | 20.8 | 15.5 | Ru 6Å/Ta 20Å |
| 75 | 17.5 | 10.0 | 20.8 | 15.5 | Ru 6Å/Ta 20Å |
| 76 | 15.0 | 15.0 | 20.8 | 15.5 | Ru 6Å/Ta 20Å |
| 77 | 12.5 | 20.0 | 20.8 | 15.5 | Ru 6Å/Ta 20Å |
| 78 | 10.0 | 25.0 | 20.8 | 15.5 | Ru 6Å/Ta 20Å |
| 79 | 7.5 | 30.0 | 20.8 | 15.5 | Ru 6Å/Ta 20Å |
| 80 | 5.0 | 35.0 | 20.8 | 15.5 | Ru 6Å/Ta 20Å |

Fig.16

MAGNETORESISTIVE HEAD AND MANUFACTURING METHOD THEREOF

CROSS-REFERENCES TO RELATED APPLICATIONS

This application claims priority from Japanese Patent Application No. JP2004-192463, filed Jun. 30, 2004, the entire disclosure of which is incorporated herein by reference.

BACKGROUND OF THE INVENTION

The present invention relates to a magnetoresistive head and a manufacturing method thereof. It also relates to a magnetic disk drive using the magnetoresistive head.

A spin valve device utilizing a giant magnetoresistive effect (GMR) has been utilized as a reading device for a magnetic disk drive. A synthetic ferri-type spin valve film referred to as a bottom type generally comprises a constitution of substrate/underlayer/anti-ferromagnetic layer/first ferromagnetic layer/anti-ferromagnetic coupling layer/second ferromagnetic layer/Cu intermediate layer/free layer/protective layer. Materials often used for the layers described above can include MnPt or MnIr for the anti-ferromagnetic layer, CoFe for the first ferromagnetic layer, Ru for the anti-ferromagnetic coupling layer, CoFe for the second ferromagnetic layer and CoFe/NiFe for the free layer.

Patent Document 1 (JP-A No. 2002-289947) discloses that the exchange coupling magnetic field between the anti-ferromagnetic layer and the first ferromagnetic layer is increased in a bottom type coupling film by using an anti-ferromagnetic layer comprising MnZPt100-Z, $53 \leq Z \leq 57$ at % and a first ferromagnetic layer comprising $Co_xFe_{100-X}$, $42 \leq X \leq 83$ at %. The coupling film comprises a constitution of underlayer/anti-ferromagnetic layer/ferromagnetic layer, which is not constituted as a synthetic ferri-type spin valve film.

On the other hand, Patent Document 2 (JP-A No. 2001-189503) discloses that the magnetoresistance ratio increases and the soft magnetic property of the free layer is improved in a case of selecting the first ferromagnetic layer of the bottom type synthetic ferri-type spin valve film such that the closed packed face of fcc or hcp is oriented in the in-plane direction of the film. According to Patent Document 2, it is probable that in a case where the first ferromagnetic layer comprises $CoFe_x$, since it takes an fcc structure within a range of the Fe composition x of: $0 \leq x \leq 20$ at %, high magnetoresistance ratio and improved soft magnetic property of the free layer can be obtained.

BRIEF SUMMARY OF THE INVENTION

For stabilization of the performance of a spin valve device for external magnetic fields, it is necessary to increase the reversing magnetic field for magnetization of the pinned layer. What is necessary for increasing the reversing magnetic field for the magnetization of the pinned layer is to increase the magnetic exchange coupling energy between the anti-ferromagnetic layer and the first ferromagnetic layer and to increase the anti-ferromagnetic coupling energy between the first ferromagnetic layer and the second ferromagnetic layer generated through the anti-ferromagnetic coupling layer.

Further, the direction of magnetization of the free layer changes in accordance with the signal magnetic fields. When the direction of the magnetization of the free layer changes, the resistance of a spin valve film changes due to the magnetoresistive effect, so that read-back signals can be obtained by detecting the resistance change. In order to obtain an output with less noise from the magnetoresistive head, it is necessary to improve the soft magnetic property of the free layer. That is, it is necessary to decrease the coercivity of the free layer for obtaining stable read-back signals. Further, in order to prevent the change of the soft magnetic property of the free layer due to the stress applied to the spin valve film, it is necessary to decrease the absolute value of the magnetostriction of the free layer.

For use of the magnetoresistive device as the magnetoresistive head, it is necessary not only to increase the exchange coupling field between the anti-ferromagnetic layer and the ferromagnetic layer adjacent therewith by the technique disclosed in Patent Document 1 but also to provide excellent anti-ferromagnetic coupling energy between the ferromagnetic layers by way of the anti-ferromagnetic coupling layer, magnetoresistance ratio and good soft magnetic property of the free layer. Accordingly, a feature of the invention is to provide an MnPt anti-ferromagnetic bottom type synthetic ferri-type spin valve film having not only strong exchange coupling energy between the anti-ferromagnetic layer and the first ferromagnetic layer but also excellent anti-ferromagnetic coupling energy between the first ferromagnetic layer and the second ferromagnetic layer through the Ru anti-ferromagnetic coupling layer and, further, higher magnetoresistance ratio and excellent soft magnetic property of the free layer.

In accordance with an embodiment of the present invention, a magnetoresistive head comprises, on a substrate, an anti-ferromagnetic layer containing MnPt, a pinned layer, a free layer containing CoFe, a non-magnetic spacer layer formed between the pinned layer and the free layer and a protective layer, in which the anti-ferromagnetic layer is disposed between the substrate and the free layer, wherein the pinned layer has a first ferromagnetic layer and a second ferromagnetic layer anti-ferromagnetically coupled to each other by way of an anti-ferromagnetic coupling layer, the composition of the first ferromagnetic layer disposed between the anti-ferromagnetic coupling layer and the anti-ferromagnetic layer is within a range of about: $Co_{100-X}Fe_X$ (at %) $20 < X \leq 50$, and the magnetoresistance ratio is about 13.3 (%) or more.

Further, in another embodiment, the first ferromagnetic layer disposed between the anti-ferromagnetic coupling layer and the anti-ferromagnetic layer is constituted with $Co_{100-X}Fe_X$ (at %) and the composition X is changed within the layer. The first ferromagnetic layer is formed as a two-layered structure, and the $Co_{100-X}Fe_X$ layer on the side adjacent with the MnPt anti-ferromagnetic layer is defined as: $20 < X \leq 50$ at % and the $CoFe_y$ layer on the side adjacent with the anti-ferromagnetic coupling layer Ru is defined as: $0 \leq y \leq 10$ at %.

The present invention can provide a magnetoresistive head having high magnetoresistance ratio, excellent soft magnetic property of the free layer and exchange coupling field of the pinned layer.

BRIEF DESCRIPTION OF THE DRAWINGS

FIG. 15 shows the configuration of the free layer and the protective layer in Embodiment 4.

DETAILED DESCRIPTION OF THE INVENTION

Figure 1:
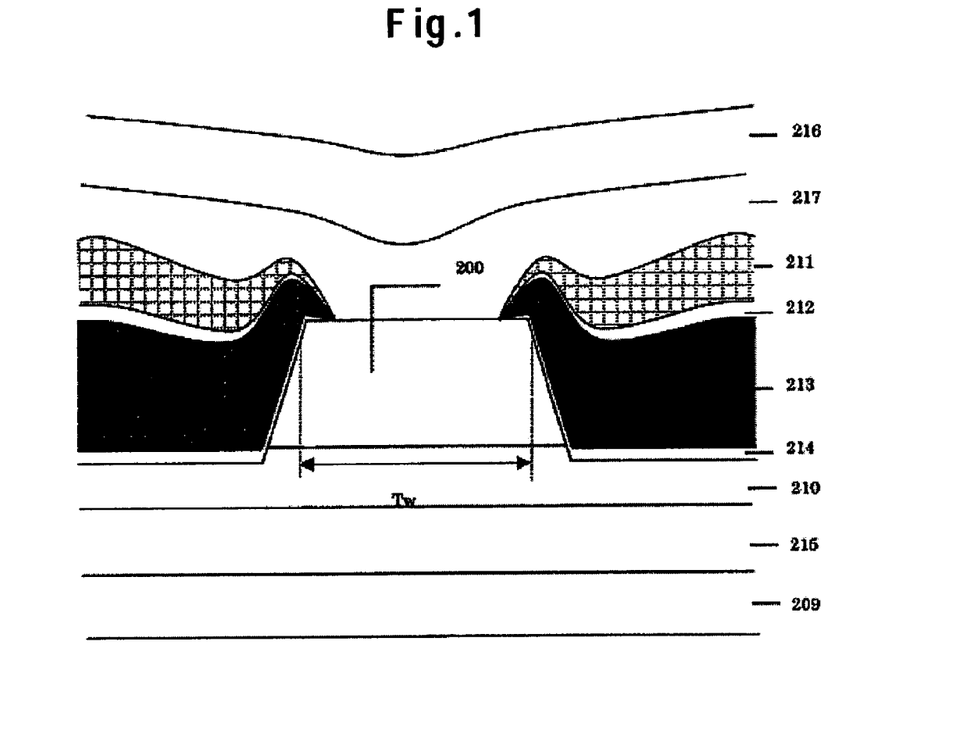
FIG. 1 is a cross-sectional view of a read magnetic head to which the present invention is applied.

FIG. 1 is a diagram illustrating a magnetoresistive head according to the present invention as viewed from an air bearing surface. On a substrate 209, are deposited a magnetoresistive device 200 constituted with a plurality of layers by way of a lower shield 215 and a lower gap 210 comprising an insulative film such as made of alumina. A magnetic domain control film 213 which controls the magnetic domain of the pinned layer, an electrode 211 and under films 212, 214 thereof are disposed on both sides of the magnetoresistive device 200 operating as a read sensor film. The magnetoresistive head is a CIP type head and the electrode is disposed such that the current path flows perpendicular to the direction of stacking the plurality layers of the magnetoresistive device 200. Above the electrode 211 are disposed an upper gap 217 and an upper shield 216. In the manufacturing step, a substrate 209 comprising glass is at first provided, the shield film 215 and the insulative film 210 are deposited, on which the magnetoresistive device 200 is deposited, and the layers deposited in the magnetoresistive device are etched so as to provide the magnetoresistive device with a tapered angle by using a photomask. Then, the magnetic domain control film 213 and the electrode 211 are formed. Thereafter, the upper gap 217 comprising the insulative film and the upper shield 216 are formed.

Embodiment 1

Figure 2:
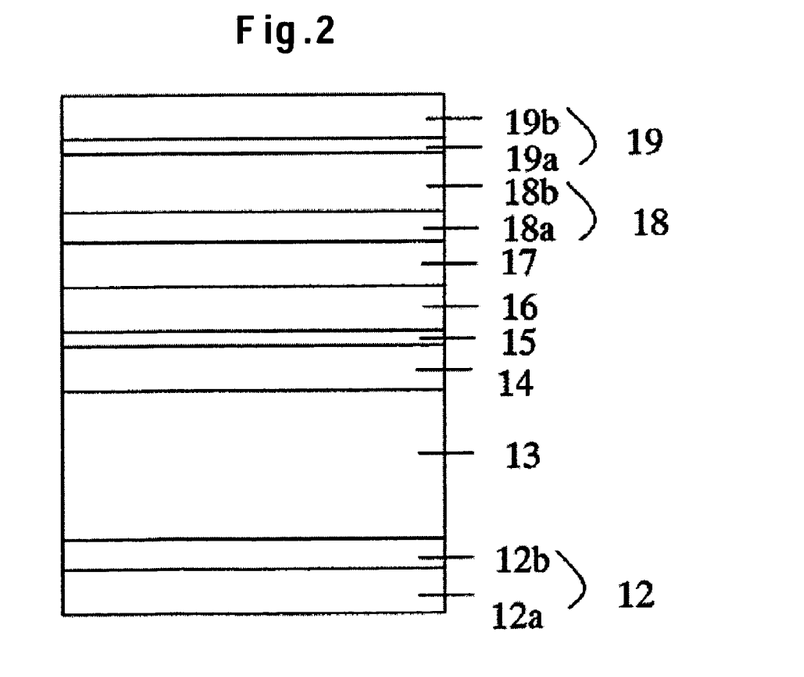
FIG. 2 is a schematic view of the film configuration of a magnetoresistive device in Embodiment 1.

FIG. 2 shows a layer constitution of the magnetoresistive device 200 according to Embodiment 1. The magnetoresistive device 200 has a film configuration comprising an underlayer 12, an anti-ferromagnetic layer 13, a first ferromagnetic layer 14, an anti-ferromagnetic coupling layer 15, a second ferromagnetic layer 16, a non-magnetic spacer layer 17, a free layer 18, and a protective layer 19. The underlayer 12 has a two-layered structure comprising a first underlayer 12a containing NiFeCr and a second underlayer 12b containing NiFe. The anti-ferromagnetic layer 13 is constituted with MnPt. Each of the first ferromagnetic layer 14 and the second ferromagnetic layer 16 contains CoFe. The anti-ferromagnetic coupling layer 15 contains Ru and serves to anti-ferromagnetically couple the magnetization direction between the first ferromagnetic layer 14 and the second ferromagnetic layer 16. The non-magnetic spacer layer 17 contains Cu. The free layer comprises a two-layered structure of a first free layer 18a of CoFe and a second free layer 18b of NiFe. NiFe in the second free layer 18b has an effect of reducing the coercivity of the free layer. For increase of the magnetoresistance ratio, CoFe of the first free layer 18a is disposed on the side of the non-magnetic spacer layer 17 with respect to the second free layer 18b. The protective layer 19 has a two-layered configuration having a first protective layer 19a containing Cu or Ru and a second protective layer 19b containing Ta. These layers are deposited over the lower gap 210 sequentially from the underlayer 12 situated below. The Fe composition x of $Co_{100-x}Fe_x$ of the first ferromagnetic layer 14 has a constitution in a range of about: $20<x\leq50$ at %, preferably $25\leq x\leq35$ at % near 30 at %. Within the constitution described above, it is possible to provide a device with higher magnetoresistance ratio and lower coercivity of the free layer than those in the case of the Fe composition x of $CoFe_x$ of: $0<x\leq20$ at %. That is, a magnetoresistive device which is used preferably for a magnetic head with the magnetoresistance ratio of about 13.3% or more and the coercivity of the free layer of about 1.0 Oe or less can be obtained.

Figure 3:
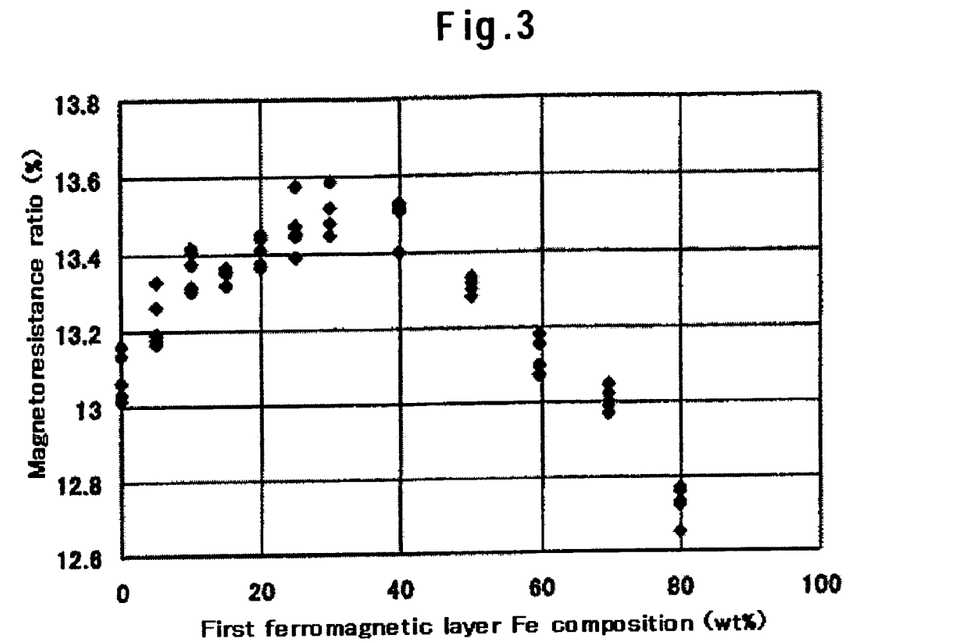
FIG. 3 is a graph showing a relation between the Fe composition of the first ferromagnetic layer and magnetoresistance ratio.
Figure 4:
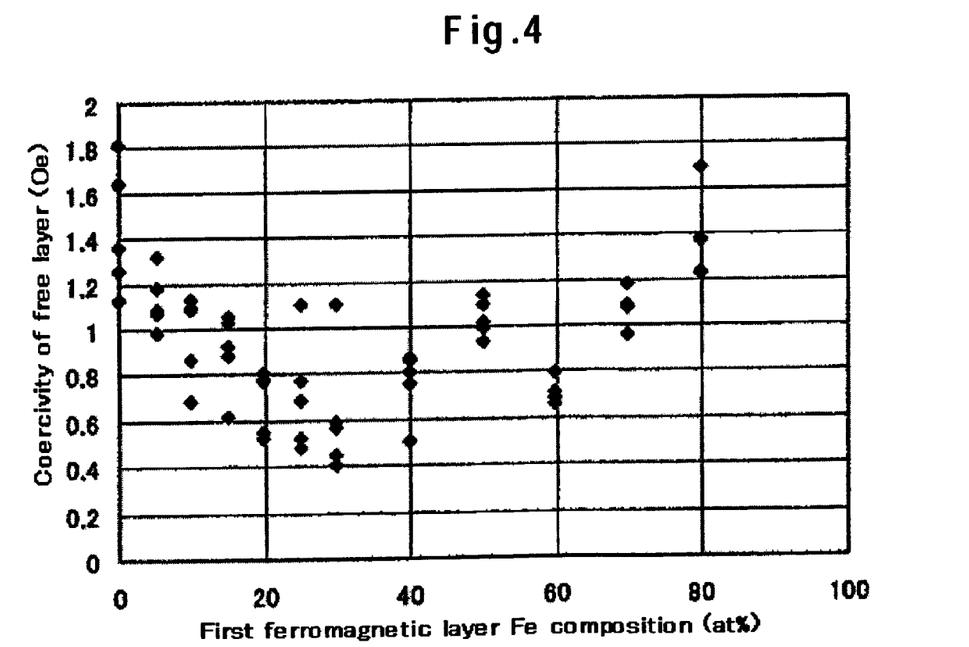
FIG. 4 is a graph showing a relation between the Fe composition of the first ferromagnetic layer and coercivity of the free layer.

An MnPt anti-ferromagnetic bottom type synthetic ferritype spin valve film comprising glass substrate/NiFeCr 32 Å/NiFe 8 Å/MnPt 140 Å/$CoFe_x$/Ru 8 Å/$CoFe_{10}$ 20/Cu 17.8 Å/CoFe 10 Å/NiFe 15 Å/Cu 6 Å/Ta 20 Å was manufactured by a DC magnetron sputtering apparatus and characteristics thereof were measured. NiFeCr/NiFe is the underlayer and Cu/Ta is the protective layer. CoFe for the first ferromagnetic layer was prepared by co-sputtering of a Co target and an Fe target. The CoFe composition in the first ferromagnetic layer was changed by changing the ratio of electric power applied to the Co target and the Fe target upon film deposition of CoFe in the first ferromagnetic layer. Further, since the saturated magnetic flux density is different depending on the Fe composition of CoFe in the first ferromagnetic layer, the thickness of the ferromagnetic layer was controlled such that the magnetization of the first ferromagnetic layer is constant for each of the Fe compositions. FIG. 3 shows the dependence of the magnetoresistance ratio of the spin valve film on the x composition. FIG. 4 shows the dependence of the coercivity of the free layer of the spin valve film on the composition x.

In view of FIGS. 3 and 4, the magnetoresistance ratio is at the maximum and the coercivity of the free layer is at the minimum when the CoFe composition in the first ferromagnetic layer is about 30 at %. In particular, high magnetoresistance ratio and small coercivity of the free layer can be attained at about $20<x\leq50$ at %. The magnetoresistance ratio is as high as about 13.3% or more near 30 at % Fe than that in a range of about: $0\leq x\leq20$ at % Fe. This is because the magnetic moment per unit volume is at the maximum near x=30, the thickness of the first ferromagnetic layer can be decreased and the shunt loss of current can be reduced. Further, the magnetoresistance ratio is decreased as the Fe addition amount is increased. This is because the crystal structure of the first ferromagnetic layer becomes bcc and the crystal structure from the second ferromagnetic layer to the free layer changes from good fcc structure. The coercivity of the free layer is decreased as 1.0 or less at 30 at % Fe than in a range of about: $0 \leq x \leq 20$ at % Fe. This is because the crystal grains of the first ferromagnetic layer are fine crystals near: x=30 and the crystal grain size of the free layer is appropriate. As the amount of Fe addition is increased further, the crystal structure of the first ferromagnetic layer becomes bcc and the crystal structure of the free layer is not formed as good fcc structure.

These results show that it is not always necessary that the crystal structure of the first ferromagnetic layer is fcc. The results are different from the existent concept that the first ferromagnetic layer has to be the fcc structure in order to obtain high magnetoresistance ratio and excellent soft magnetic property of the free layer. That is, the following has been considered so far as described in Patent Document 2. The magnetoresistance ratio increases and the soft magnetic property of the free layer is improved in a case of selecting the first ferromagnetic layer of the bottom type synthetic ferri-type spin valve film such that the closed packed face of fcc or hcp is oriented in the in-plane direction. The Fe composition for the CoFe first ferromagnetic layer is therefore smaller than 20 at % where CoFe has the fcc structure. However, as a result of the study made by the present inventors, a region of the Fe composition of more than 20 at %, that is, a range of about: $20 < x \leq 50$ at % is excellent in order to increase the anti-ferromagnetic coupling energy between the first ferromagnetic layer and the second ferromagnetic layer through the Ru anti-ferromagnetic coupling layer, increase the magnetoresistance ratio of the spin valve film, decrease the absolute value for the magnetostriction of the free layer and decrease the coercivity of the free layer, and this can attain the magnetoresistance ratio of about 13.3% or more and the coercivity of the free layer of 1.0 Oe or less.

It is probable that the reason why magnetoresistance ratio can be obtained even when the crystal structure of the first ferromagnetic layer is not fcc is described below. When the Fe composition for CoFe in the first ferromagnetic layer has a value of more than about 20 at %, since the saturated magnetic flux density increases, the thickness of the first ferromagnetic layer can be reduced compared with the case where the Fe composition is about 20 at % or less and the shunt loss can be reduced, increasing the magnetoresistance ratio. On the other hand, the effect of decreasing the magnetoresistance ratio when the Fe composition for CoFe is increased and the crystal structure becomes bcc is relatively small, and increase of the magnetoresistance ratio by reducing the shunt loss is predominant. It is therefore probable as a result that the magnetoresistance ratio is maximized at the Fe composition of about 30 at %. Further, it is probable that the reason why the soft magnetic property of the free layer is improved even when the crystal structure of the first ferromagnetic layer is not fcc is described below. As the Fe composition in the first ferromagnetic layer is made greater than about 20 at %, the fcc structure becomes unstable and the bcc structure becomes stable; therefore, the crystal grain size of the first ferromagnetic layer is relatively small near the boundary region. In the bottom type synthetic ferri-type spin valve film, since the first ferromagnetic layer functions as the underlayer for the free layer, the crystal grain size of the free layer is also decreased to improve the soft magnetic property of the free layer. On the other hand, the effect of worsening the soft magnetic property of the free layer when the crystal structure of the first ferromagnetic layer becomes bcc is relatively small and the effect obtained by refining the crystal grain size is superior to the former effect. Therefore, the soft magnetic property of the free layer becomes favorable as a result. Such result cannot be anticipated from the existent concept in which high magnetoresistance ratio and the excellent soft magnetic property of the free layer can be obtained by causing the first ferromagnetic layer to be the fcc structure.

Embodiment 2

Figure 5:
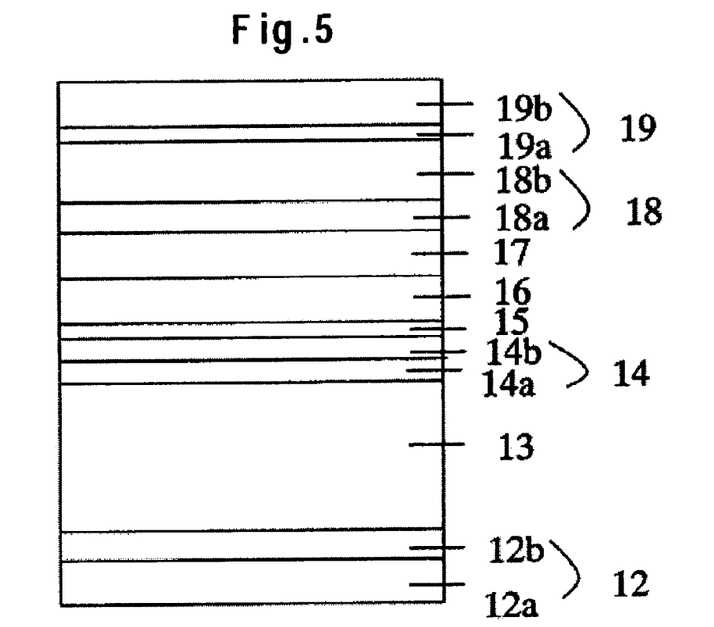
FIG. 5 is a schematic view for the film configuration of a magnetoresistive device in Embodiment 2.

FIG. 5 shows a layer structure of a magnetoresistive device 200 according to Embodiment 2. The magnetoresistive device comprises a film configuration comprising an underlayer 12, an anti-ferromagnetic layer 13, a first ferromagnetic layer 14, an anti-ferromagnetic coupling layer 15, a second ferromagnetic layer 16, a non-magnetic spacer layer 17, a free layer 18 and a protective layer 19. The underlayer 12 has a two-layered constitution comprising a first underlayer 12a containing NiFeCr and a second underlayer 12b containing NiFe. The anti-ferromagnetic layer 13 comprises MnPt. The first ferromagnetic layer 14 and the second ferromagnetic layer 16 each contain CoFe. The anti-ferromagnetic coupling layer 15 contains Ru and has a role of anti-ferromagnetically coupling the first ferromagnetic layer 14 and the second ferromagnetic layer 16. The non-magnetic spacer 17 contains Cu. The free layer has a two-layered structure comprising a first free layer 18a of CoFe and a second free layer 18b of NiFe. Since NiFe lowers the coercivity, the second free layer 18b is disposed on the side of the protective layer 19 with respect to the first free layer 18a. The protection layer 19 has a two-layered structure comprising a first protective layer 19a containing Cu or Ru and a second protective layer 19b containing Ta. In this embodiment, the compositional ratio of Fe is changed in the first ferromagnetic layer 14. For the change of the compositional ratio of Fe, when the first ferromagnetic layer 14 is deposited, layers different from each other in Fe compositional ratio are deposited separately, that is, a layer with a relatively high Fe compositional ratio is deposited at first and then a layer with a relatively low Fe compositional ratio is deposited subsequently. The Fe composition ratio greater on the side of the anti-ferromagnetic layer is made larger than the Fe compositional ratio on the side of the anti-ferromagnetic coupling layer. This makes it possible to increase the anti-ferromagnetic coupling energy between the first ferromagnetic layer 14 and the second ferromagnetic layer 16 by way of the anti-ferromagnetic coupling layer 15 comprising Ru, and increase the exchange coupling energy between the anti-ferromagnetic layer 13 and the first ferromagnetic layer 14. A layer configuration is particularly excellent in which the first ferromagnetic layer has a two-layered structure, the $CoFe_x$ layer on the side adjacent to the MnPt anti-ferromagnetic layer being about: $20 < x \leq 50$ at % and the $CoFe_y$ layer on the side adjacent to the anti-ferromagnetic coupling layer Ru being about $0 \leq y \leq 10$ at %. The plurality of layers constituting the magnetoresistive device are deposited over the lower gap 210 sequentially from the underlayer 12 situated below.

A spin valve film of a structure comprising: glass substrate/ NiFeCr 32 Å/NiFe 8 Å/MnPt 140 Å/$CoFe_{30}$/$CoFe_{10}$/Ru 5.5 Å/$CoFe_{10}$ 20 Å/Cu 17.8 Å/CoFe 10 Å/NiFe 15 Å/Cu 6 Å/Ta 20 Å film was manufactured and the characteristics were measured. As a Comparative Example 1, a spin valve film of a structure comprising glass substrate/NiFeCr 32 Å/NiFe 8 Å/MnPt 140 Å/$CoFe_{10}$/$CoFe_{30}$/Ru 5.5 Å/$CoFe_{10}$ 20 Å/Cu 17.8 Å/CoFe 10 Å/NiFe 15 Å/Cu 6 Å/Ta 20 Å. In the spin valve films of Embodiment 2 and Comparative Example 1 was manufactured. In the case of the spin valve film of Embodiment 1 and Comparative Example 1, $CoFe_{30}$/$CoFe_{10}$ and $CoFe_{10}$/$CoFe_{30}$ function respectively as the first ferromagnetic layer. The film thicknesses of $CoFe_{30}$ and the $CoFe_{10}$ were controlled so that the amount of magnetization of $CoFe_{30}/CoFe_{10}$ and $CoFe_{10}/CoFe_{30}$ could be constant.

Figure 6:
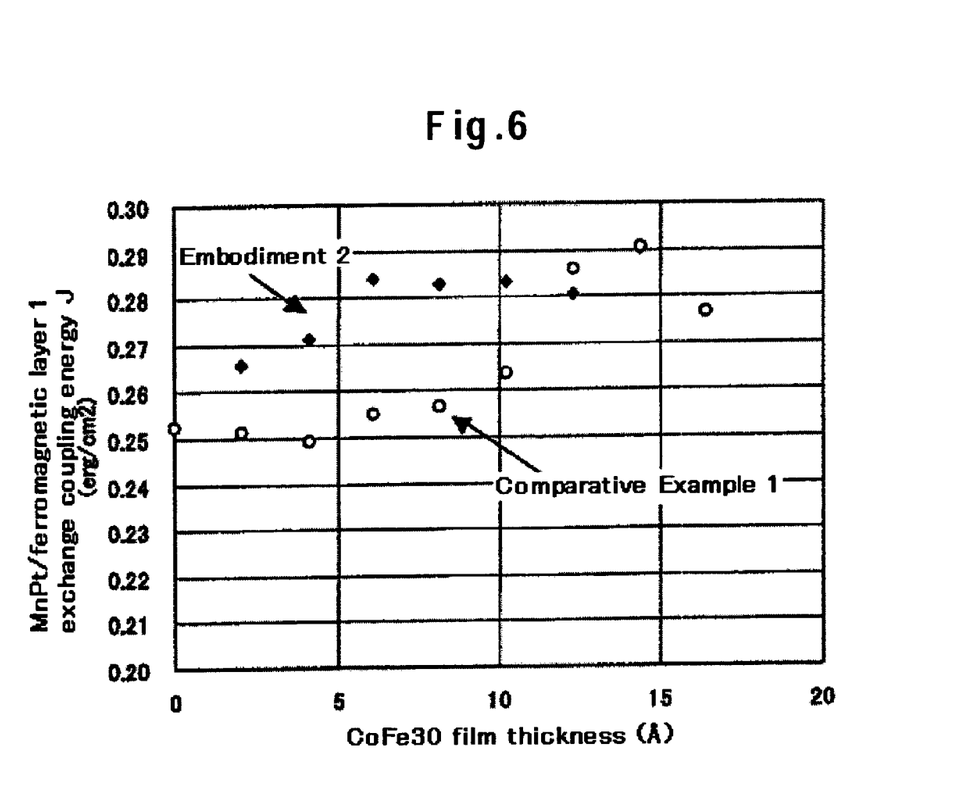
FIG. 6 is a graph showing a relation between the thickness of the $CoFe_{30}$ film in the first ferromagnetic layer of a two-layered structure and exchange coupling energy between MnPt and the first ferromagnetic layer.

FIG. 6 shows the dependence of the exchange coupling energy between the first ferromagnetic layer and the MnPt anti-ferromagnetic layer of the spin valve films on the $CoFe_{30}$ film thickness. For measurement of the exchange coupling energy between the MnPt anti-ferromagnetic layer and the first ferromagnetic layer, a sample of a structure comprising glass substrate/NiFeCr 32 Å/NiFe 8 Å/MnPt 140 Å/first ferromagnetic layer/Cu 23.8 Å/Ta 20 Å was manufactured. Then, the exchange coupling energy was calculated based on the shift of the magnetization loop of the first ferromagnetic layer from the original point. The exchange coupling energy between the MnPt anti-ferromagnetic layer and the first ferromagnetic layer is increased at the $CoFe_{30}$ film thickness of 6 to 16 Å while the first ferromagnetic layer in Embodiment 2 is the configuration of $CoFe_{30}/CoFe_{10}$. On the other hand, the exchange coupling energy is increased at the film thickness of $CoFe_{30}$ of 12 to 16 Å while the first ferromagnetic layer in Comparative Example is the configuration of $CoFe_{10}/CoFe_{30}$.

Figure 7:
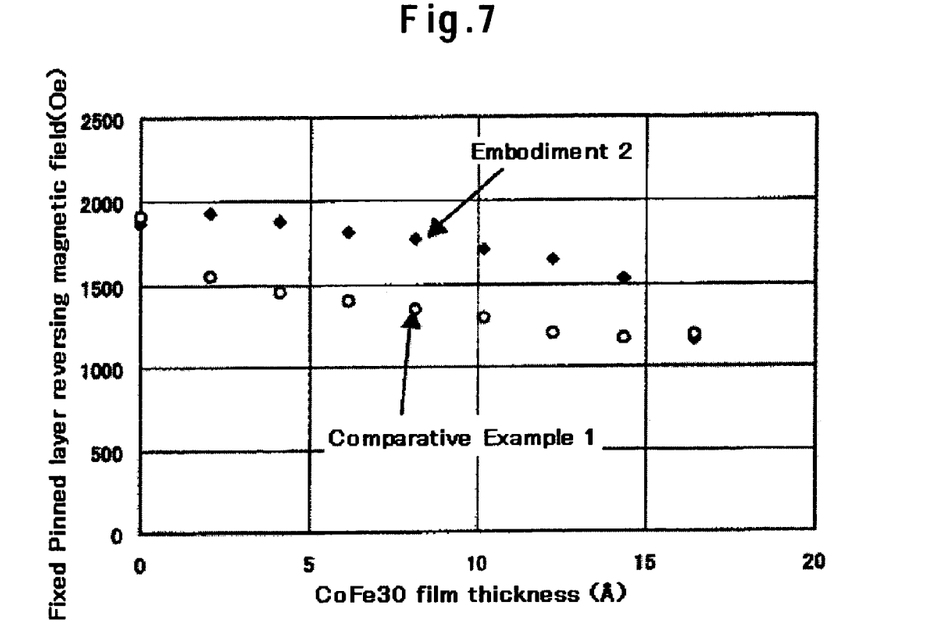
FIG. 7 is a graph showing a relation between the $CoFe_{30}$ film thickness of the first ferromagnetic layer of the two-layered structure and the reversing magnetic field of a pinned layer.

Further, FIG. 7 shows the dependence of the reversing magnetic field of the pinned layer in the synthetic ferri-type pinned layer of the spin valve film in Embodiment 2 and the Comparative Example 1 on a $CoFe_{30}$ film thickness. The reversing magnetic field of the pinned layer in the synthetic ferri-type pinned layer is a magnetic field where the amount of resistance change is one-half the maximum amount of resistance change in the magnetic field region where the magnetization of the fixed layer is rotated on the resistance change curve, which is an index of the anti-ferromagnetic coupling energy between the first ferromagnetic layer and the second ferromagnetic layer by way of Ru.

The reversing magnetic field of the pinned layer in the synthetic ferri-type pinned layer is increased at the film thickness of the $CoFe_{30}$ of 0 to 8 Å in the $CoFe_{30}/CoFe_{10}$ configuration of the first ferromagnetic layer of Embodiment 2. That is, the ferromagnetic coupling energy between the first ferromagnetic layer and the second ferromagnetic layer by way of Ru is increased at the film thickness of $CoFe_{30}$ of 0 to 8 Å in the constitution of $CoFe_{30}/CoFe_{10}$ of the first ferromagnetic layer.

In view of FIGS. 6 and 7, the exchange coupling energy between the MnPt anti-ferromagnetic layer and the first ferromagnetic layer, and the anti-ferromagnetic coupling energy between the first ferromagnetic layer and the second ferromagnetic layer by way of Ru can be increased at the film thickness of $CoFe_{30}$ within a range of 6 to 8 Å in the $CoFe_{30}/CoFe_{10}$ two-layered configuration of the first ferromagnetic layer. The magnetoresistance ratio of the films and the coercivity of the free layer were satisfactorily, substantially equal to those in a case of constituting the first ferromagnetic layer as a $CoFe_{30}$ single layer. Further, it has been found that the composition of the $CoFe_y$ layer on the side adjacent to the Ru anti-ferromagnetic coupling layer in the first ferromagnetic layer is defined as about: $0 \leq y \leq 10$ at % in Embodiment 2, whereby it is possible to obtain a high exchange coupling magnetic field between MnPt and the first ferromagnetic layer, high coupling energy of the first ferromagnetic layer/Ru anti-ferromagnetic coupling layer/second ferromagnetic layer, a high magnetoresistance ratio and excellent soft magnetic property of the free layer.

A high exchange coupling magnetic field between MnPt and the first ferromagnetic layer, high coupling energy of first ferromagnetic layer/Ru anti-ferromagnetic coupling layer/second ferromagnetic layer, a high magnetoresistance ratio and excellent soft magnetic property of the free layer can be obtained by adopting the dual layer structure for the first ferromagnetic layer, defining the composition of the $CoFe_x$ layer on the side adjacent to the MnPt anti-ferromagnetic layer as about: $20 < x \leq 50$ at % and defining the composition of the $CoFe_y$ layer on the side adjacent with the anti-ferromagnetic coupling layer Ru as about: $0 < y \leq 10$ at %.

Embodiment 3

In Embodiment 3, Fe component z of $CoFe_z$ in the composition of the second ferromagnetic layer 16 in the first and second embodiments is changed. A spin valve film comprising glass substrate/NiFeCr 32 Å/NiFe 8 Å/MnPt 140 Å/$CoFe_{50}$ 15 Å/Ru 8 Å/$CoFe_z$/Cu 17.8 Å/CoFe 10 Å/NiFe 15 Å/Cu 6 Å/Ta 20 Å film was manufactured and the characteristics thereof were measured. Since the saturated magnetic flux density is different depending on the Fe composition of CoFe in the second ferromagnetic layer, the film thickness of $Co_{100-z}Fe_z$ in the second ferromagnetic layer is controlled so that the amount of magnetization for the second ferromagnetic layer can be constant for each of Fe compositions.

Figure 8:
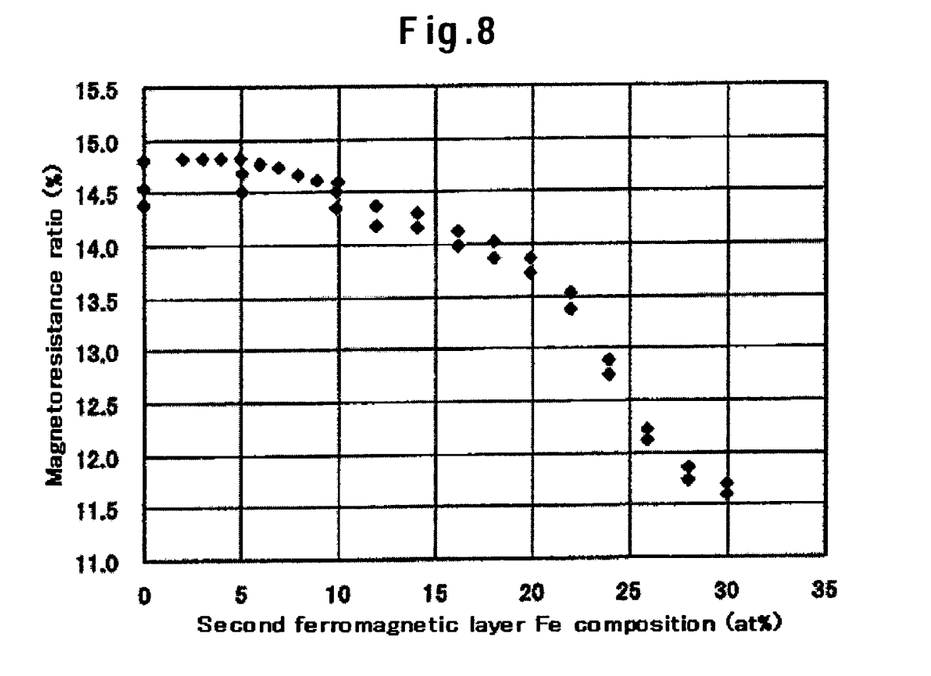
FIG. 8 is a graph showing a relation between the Fe composition of the second ferromagnetic layer and the magnetoresistance ratio.

FIG. 8 shows the dependence of the magnetoresistance ratio of the spin valve film on the Fe composition z in $Co_{100-z}Fe_z$ of the second ferromagnetic layer. In view of FIG. 8, a high magnetoresistance ratio can be obtained by defining the Fe composition z in $Co_{100-z}Fe_z$ of the second ferromagnetic layer to about: $0 < x \leq 5$ at %.

Figure 9:
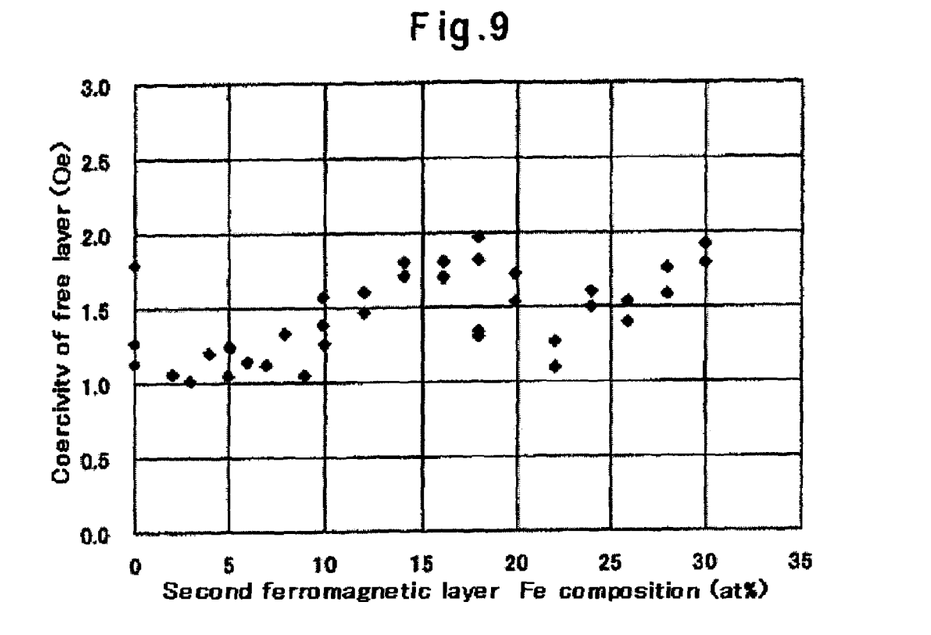
FIG. 9 is a graph showing a relation between the Fe composition of the second ferromagnetic layer and the coercivity of free layer.

FIG. 9 shows the dependence of the coercivity of the free layer of the spin valve film on the Fe composition in CoFe of the second ferromagnetic layer. In view of FIG. 9, a small coercivity of the free layer can be obtained by defining the Fe composition z in $Co_{100-z}Fe_z$ of the second ferromagnetic layer as about: $0 < z \leq 7$ at %. In view of FIGS. 8 and 9, a high magnetoresistance ratio and small coercivity of the free layer can be obtained by defining the $Co_{100-z}Fe_z$ composition in the second ferromagnetic layer as about $0 < z \leq 5$ at %. Further, it has been found that when the $Co_{100-z}Fe_z$ composition in the second ferromagnetic layer is defined as about $0 < z \leq 10$ at %, the anti-ferromagnetic coupling energy between the first ferromagnetic layer and the second ferromagnetic layer by way of the Ru film can also be increased. As a conclusion, it has been found that when the Fe composition z in $Co_{100-z}Fe_z$ of the second ferromagnetic layer is defined as about: $0 < z \leq 5$ at %, a high magnetoresistance ratio, excellent soft magnetic property of the free layer and the anti-ferromagnetic coupling energy between the first ferromagnetic layer and the second ferromagnetic layer by way of Ru can be obtained.

High coupling energy for first ferromagnetic layer/Ru/second ferromagnetic layer, a magnetoresistance ratio and excellent soft magnetic property of the free layer can be obtained by defining the $Co_{100-z}Fe_z$ composition in the second ferromagnetic layer as about: $0 < z \leq 5$ at %.

Embodiment 4

Figure 14:
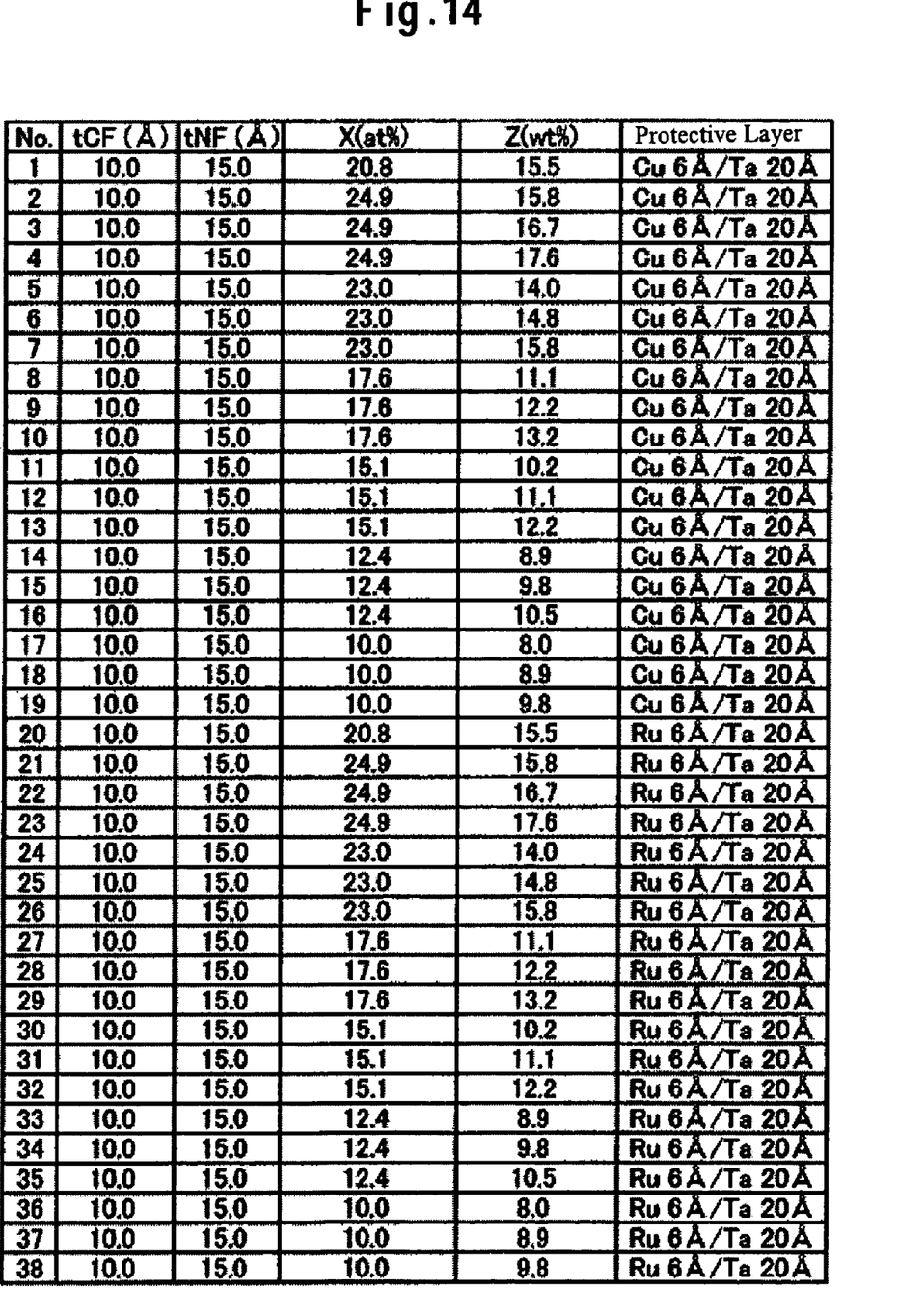
FIG. 14 shows the configuration of the free layer and the protective layer in Embodiment 4.

In Embodiment 4, the parameters for the free layer of the magnetoresistive device in Embodiments 1 and 2 were examined. A spin valve film of a configuration comprising glass substrate/NiFeCr 32 Å/NiFe 8 Å/MnPt 140 Å/$CoFe_{50}$ 15 Å/Ru 4.55 Å/$CoFe_{10}$ 20 Å/Cu 18 Å/$CoFe_X$ tCF Å/$NiFe_Z$ tNF Å/protective layer was manufactured and the characteristics thereof were measured. CoFe/NiFe is a free layer. FIGS. 14 and 15 show the free layers CoFe, free layers NiFe and protection layers of the spin valve films manufactured. In this case, parameters Y, S and T for the free layers are defined as below by using the CoFe film thickness tCF (Å) of the free layer, Fe composition X (at %) of CoFe in the free layer, NiFe film thickness tNF (Å) of the free layer, and Fe composition Z (wt %) for the free layer NiFe.

$$Y=tNF/(tNF+tCF),$$

$$Mf=tNF+2.0*tcF-3.0 \text{ (Å)},$$

$$S=a+b*Y*Z+c*Z+d*(1-Y)*X+e*X+f*Mf,$$

coefficient a=28.7, coefficient b=−4.9
coefficient c=4,9, coefficient d=−5.2,
coefficient e=0.89, coefficient f=−1.1, $$T=g+h*Y*Z+i*Z+j*(1-Y)*X+k*X+1*Mf,$$

coefficient g=0.953, coefficient h=0.661
coefficient i=−0.79, coefficient i=0.605,
coefficient k=−0.11, coefficient l=0.143.

Figure 10:
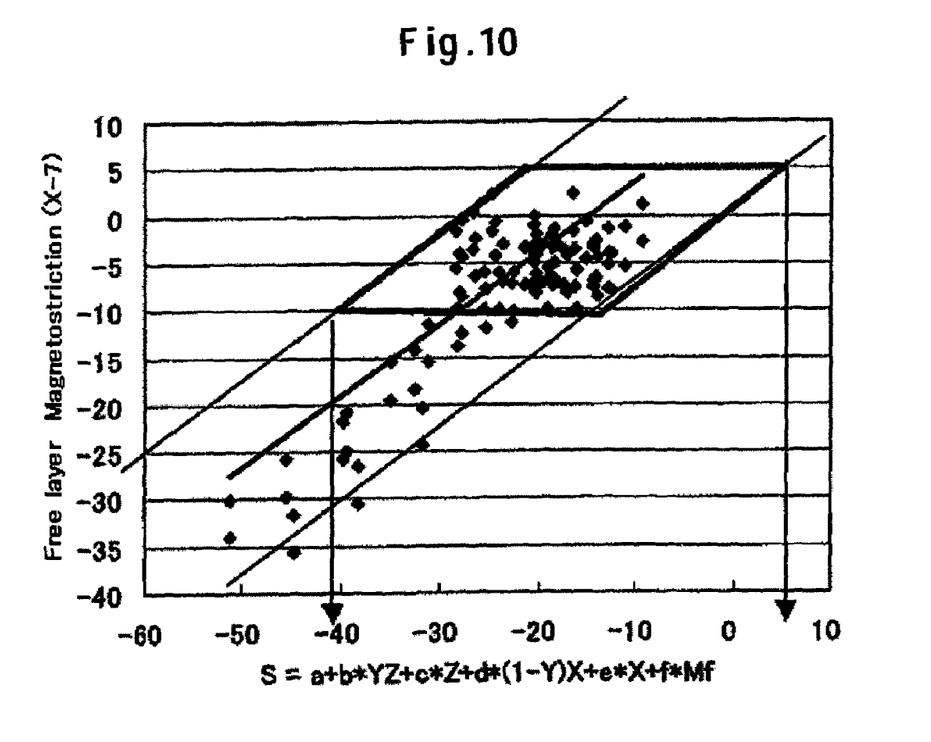
FIG. 10 is a graph showing a relation between the parameter S of the free layer and the magnetostriction of the free layer.

FIG. 10 shows the relationship between the magnetostriction of the free layer and the free layer parameter S. In view of FIG. 10 by restricting the free layer parameter S to −42≦S≦+7, the magnetostriction of the free layer can be −10$^{-7}$ or more and +5$^{-7}$ or less.

Figure 11:
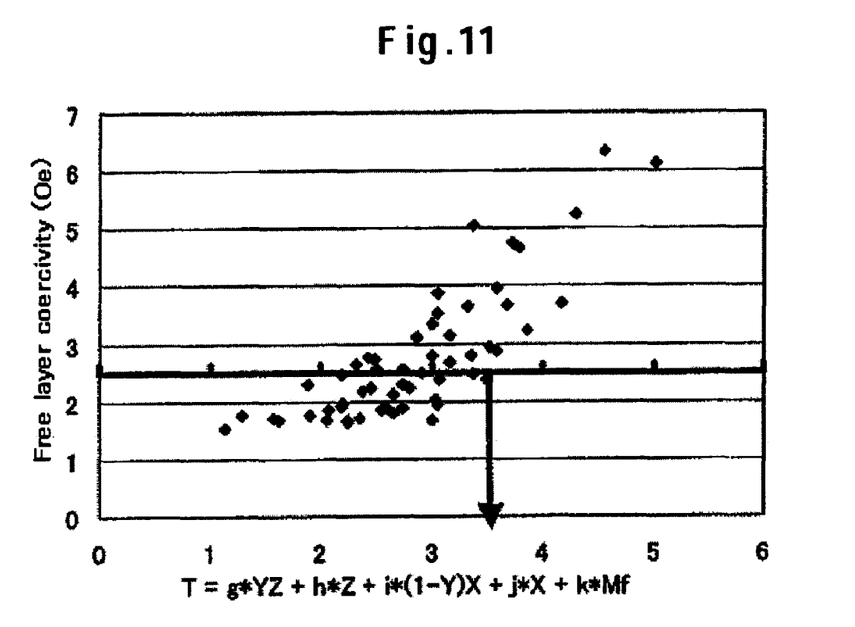
FIG. 11 is a graph showing a relation between the parameter T of the free layer and the coercivity of the free layer.

Then, FIG. 11 shows the relationship between the coercivity of the free layer and the parameter T of the free layer in Embodiment 4. In view of FIG. 11, the coercivity of the free layer can be decreased to 2.5 Oe or less by controlling the parameter T of the free layer as T≦3.6.

Figure 12:
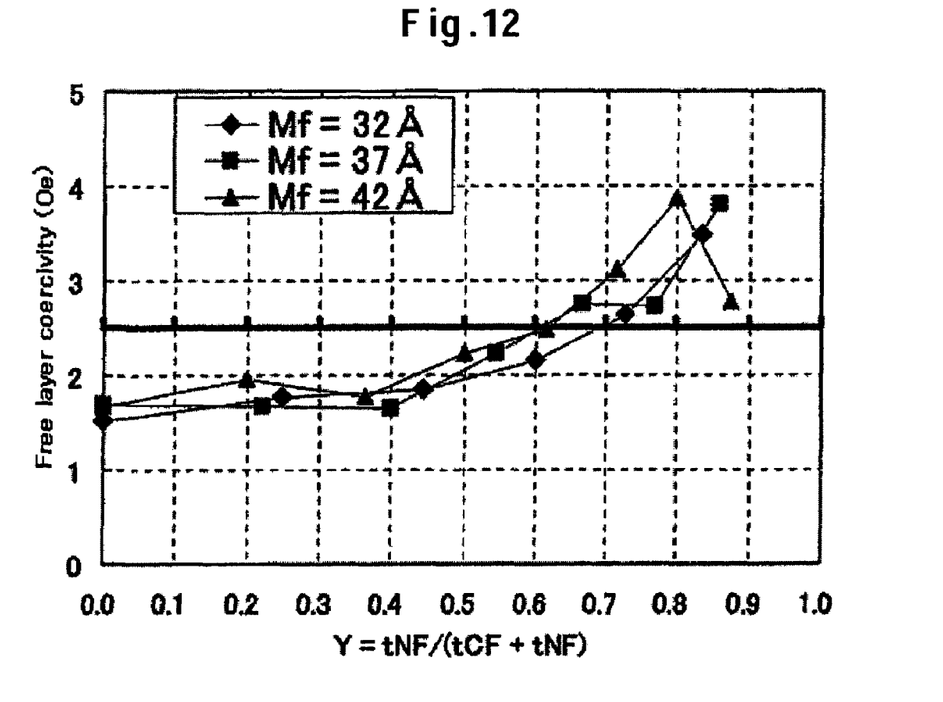
FIG. 12 is a graph showing a relation between the parameter Y of the free layer and the coercivity of the free layer.

Further, FIG. 12 shows the relationship between the coercivity of the free layer and the parameter Y of the free layer in Embodiment 4. In view of FIG. 12, the coercivity of the free layer can be decreased to 2.5 Oe or less by controlling the parameter Y of the free layer as about: 0≦y≦0.7.

In the MnPt anti-ferromagnetic bottom type synthetic ferri-type spin valve film according to this embodiment, the satisfactory soft magnetic property of the free layer can be obtained with the magnetostriction of the free layer being −10$^{-7}$ or more and +5$^{-7}$ or less and the coercivity of the free layer being 2.5 Oe or less by defining the parameters Y, S and T of the free layer within the range of about:

$$-42 \leq S \leq +7, \text{ and}$$

$$T \leq 3.6, \text{ and}$$

$$0 \leq Y \leq 0.7.$$

Figure 13:
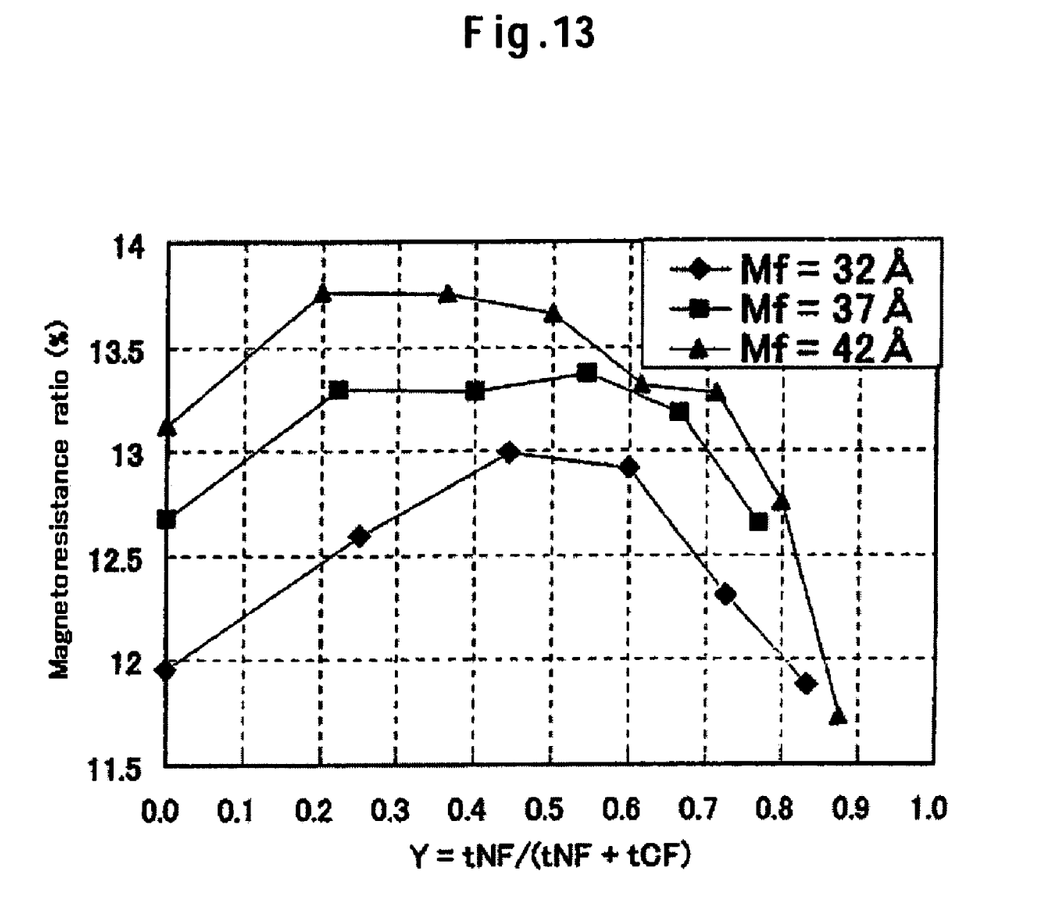
FIG. 13 is a graph showing a relation between the parameter Y of the free layer and the magnetoresistance ratio.

When the magnetization Mf of the free layer is decreased, since the magnetization of the free layer tends to rotate more relatively to the same signal magnetic field, the sensitivity of the magnetoresistive device is increased. However, when the magnetization Mf of the free layer is decreased, the magnetoresistance ratio of the spin valve film is decreased. Accordingly, the magnetization Mf of the free layer is a design parameter which is set comprehensively such that the read-back output becomes maximum relative to the same signal magnetic field. For reference, FIG. 13 shows a graph obtained by plotting the magnetoresistance ratio relative to the parameter Y of the free layer for the samples of different magnetization Mf of the free layer in Embodiment 4. High magnetoresistance ratio can be obtained within a range of the parameter Y of the free layer as about: 0.2≦Y≦0.7. In particular, a high magnetoresistance ratio of 13% or more can be obtained at magnetization Mf of the free layer of 37 Å or more. In the MnPt anti-ferromagnetic bottom type synthetic ferri-type spin valves, assuming that the Fe composition for the CoFe of the free layer as X (at %), the film thickness for CoFe of the free layer as tCF (Å), the Fe composition for NiFe of the free layer as Z (wt %) and the film thickness of the NiFe of the free layer as tNF (Å), a high, magnetostriction of the free layer of −10$^{-7}$ or more and +5$^{-7}$ or less, the coercivity of the free layer of 2.5 Oe or less and satisfactory soft magnetic property of the free layer can be obtained by Y, S and T defined as below:

$$Y=tNF/(tNF+tCF),$$

$$Mf=tNF+2.0*tcF-3.0 \text{ (Å)},$$

$$S=a+b*Y*Z+c*Z+d*(1-Y)*X+e*X+f*Mf,$$

coefficient a=28.7, coefficient b=−4.9
coefficient c=4,9, coefficient d=−5.2,
coefficient e=0.89, coefficient f=−1.1, $$T=g+h*Y*Z+i*Z+j*(1-Y)*X+k*X+1*Mf,$$

coefficient g=0.953, coefficient h=0.661
coefficient i=−0.79, coefficient i=0.605,
coefficient k=−0.11, coefficient l=0.143, and setting them in the range of about:

$$-42 \leq S +7, \text{ and}$$

$$T \leq 3.6, \text{ and}$$

$$0 \leq Y \leq 0.7.$$

Figure 16:
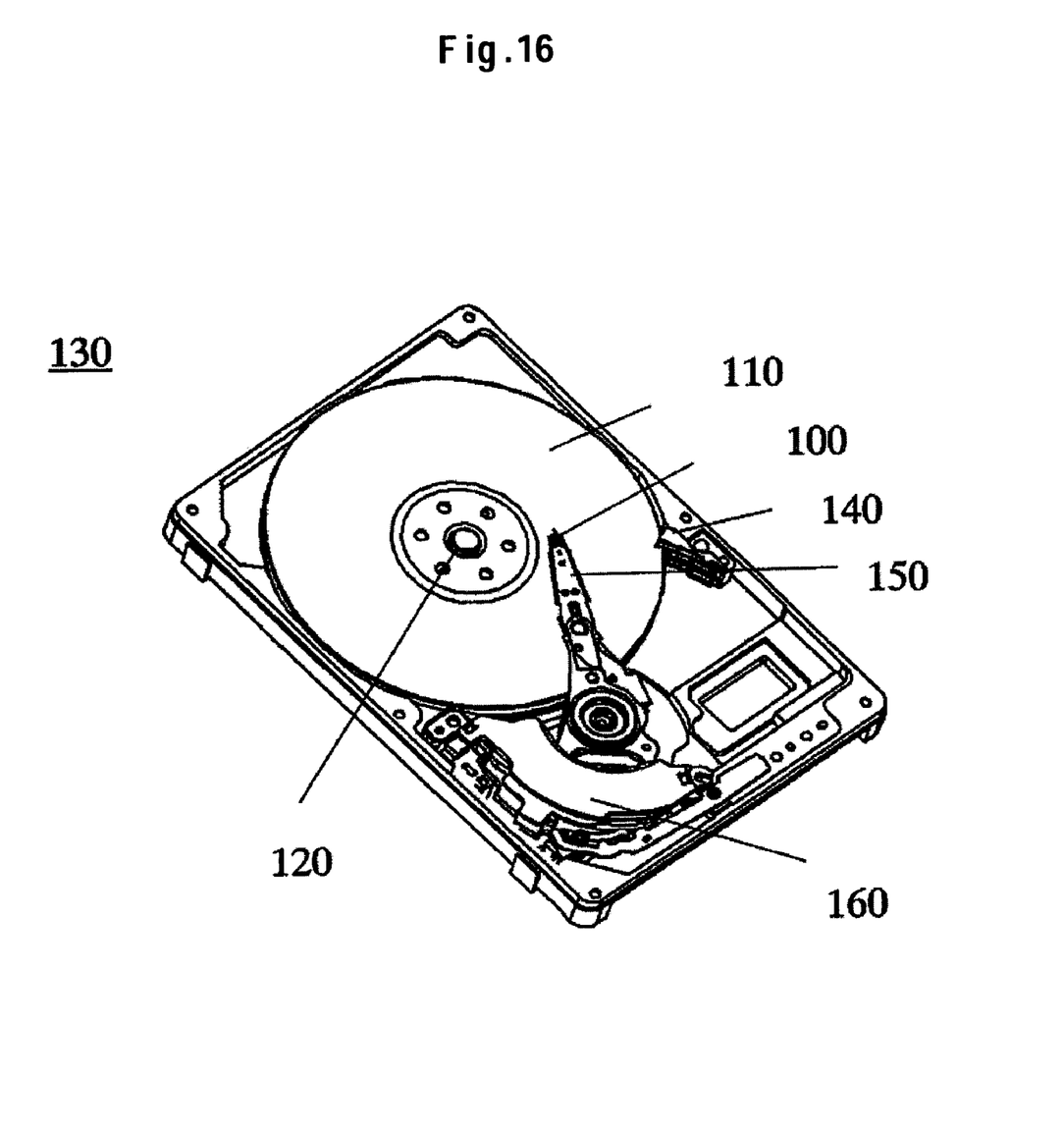
FIG. 16 shows a magnetic disk drive using the magnetoresistivity device of the invention.

FIG. 16 shows an example of a magnetic disk drive 130 applied with the magnetoresistive head having the spin valve film described in Embodiments 1 to 4. The magnetic disk drive 130 comprises a magnetic medium (disk) 110, a disk fixing mechanism 120, a ramp mechanism 140, a voice coil motor (VCM) 160, a head stack assembly (HSA) 150, and a magnetic head 100. The read magnetic head described in each of Embodiments 1 to 4 is combined with a write head to constitute a magnetic head 100.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetoresistive head comprising:
   on a substrate, an anti-ferromagnetic layer, a pinned layer in which a direction of magnetization is fixed by exchange coupling with the anti-ferromagnetic layer, a free layer, a non-magnetic spacer layer formed between the pinned layer and the free layer, and a protective layer; wherein
   the anti-ferromagnetic layer is disposed between the substrate and the free layer,
   the anti-ferromagnetic layer comprises MnPt,
   the free layer comprises CoFe,
   the pinned layer has a first ferromagnetic layer and a second ferromagnetic layer anti-ferromagnetically coupled to each other by way of an anti-ferromagnetic coupling layer,
   the composition of the first ferromagnetic layer disposed between the anti-ferromagnetic coupling layer and the anti-ferromagnetic layer is within a range of about:

$$Co_{100-X}Fe_X \text{ (at \%) } 20<X\leq50, \text{ and}$$

a magnetoresistance ratio is about 13.3 (%) or more.

2. A magnetoresistive head according to claim 1, wherein the composition of the second ferromagnetic layer disposed between the anti-ferromagnetic coupling layer and the non-magnetic spacer layer is within a range of about:

$$Co_{100-Z}Fe_Z \text{ (at \%), } 0<Z\leq5.$$

3. A magnetoresistive head according to claim 1 wherein, the free layer has a first free layer containing CoFe and is disposed on the side of the non-magnetic spacer layer and a second free layer containing NiFe and is disposed on the side of the protective layer, in which Y, S and T defined as below are within the range of about:

$$-42 \leq S \leq +7, T \leq 3.6, \text{ and } 0 \leq Y \leq 0.7,$$

assuming the Fe composition for CoFe as X (at %) and a film thickness as tCF (Å) for the first free layer, and the Fe composition for NiFe as Z (wt %) and the film thickness as tNF (Å) for the second free layer, and defining as:

$$Y = tNF/(tNF+tCF),$$

$$Mf = tNF + 2.0*tcF - 3.0 \text{ (Å)},$$

$$S = a + b*Y*Z + c*Z + d*(1-Y)*X + e*X + f*Mf,$$

coefficient a=28.7, coefficient b=−4.9
coefficient c=4,9, coefficient d=−5.2,
coefficient e=0.89, coefficient f=−1.1, $$T = g + h*Y*Z + i*Z + j*(1-Y)*X + k*X + l*Mf,$$

coefficient g=0.953, coefficient h=0.661
coefficient i=−0.79, coefficient j=0.605,
coefficient k=−0.11, coefficient l=0.143.

4. A magnetoresistive head according to claim 1, further comprising:

an underlayer having a plurality of layers disposed between the substrate and the anti-ferromagnetic layer; wherein
the free layer further contains NiFe, and NiFe is disposed on the side of a boundary with the protective film,
the anti-ferromagnetic coupling layer contains Ru,
the non-magnetic spacer film contains Cu, and
the second ferromagnetic film contains CoFe.

5. A magnetoresistive head according to claim 4, wherein the underlayer has an NiFeCr layer and an NiFe layer, and the NiFeCr layer is disposed between the NiFe layer and the substrate.

6. A magnetoresistive head according to claim 5, wherein the protective layer comprises a Ta layer and a Cu layer and the Cu layer is disposed between the Ta layer and the free layer.

7. A magnetoresistive head according to claim 5, further comprising an electrode and a magnetic domain control film; wherein the electrode is disposed such that a current path flows perpendicular to a direction of stacking the plurality of layers.

8. A magnetoresistive head according to claim 1, wherein X is within a range of 20<X<50 at %.

9. A magnetoresistive head according to claim 8, wherein X is within a range of about 25≦X≦35 at %.

10. A magnetoresistive head according to claim 9, wherein X is about 30 at %.

* * * * *

UNITED STATES PATENT AND TRADEMARK OFFICE
CERTIFICATE OF CORRECTION

PATENT NO.         : 7,474,514 B2  
APPLICATION NO. : 11/171910  
DATED                 : January 6, 2009  
INVENTOR(S)       : Nishioka et al.

Page 1 of 1

It is certified that error appears in the above-identified patent and that said Letters Patent is hereby corrected as shown below:

Column 10, Line 20 please delete "$-42 \leqq S + 7$" and insert -- $-42 \leqq S \leqq +7$ --

Signed and Sealed this

Thirty-first Day of March, 2009

JOHN DOLL  
*Acting Director of the United States Patent and Trademark Office*